No. 774,221.

Patented November 8, 1904.

UNITED STATES PATENT OFFICE.

EDWARD T. WILLIAMS, OF BOSTON, MASSACHUSETTS.

ARTICLE OF FOOD AND METHOD OF PREPARING SAME.

SPECIFICATION forming part of Letters Patent No. 774,221, dated November 8, 1904.

Application filed August 29, 1904. Serial No. 222,631. (No specimens.)

*To all whom it may concern:*

Be it known that I, EDWARD T. WILLIAMS, a citizen of the United States, residing at Boston, in the county of Suffolk and State of Massachusetts, have invented new and useful Improvements in Articles of Food and Methods of Preparing the Same, of which the following is a specification.

The object of my invention is the production of a new article of food especially adapted for use by persons affected with impoverishment of the blood.

My invention consists of a composition comprised of animal-spleen and a decoction of red bone-marrow and gelatin.

It further consists of a composition of animal-spleen, a decoction of red bone-marrow and gelatin, and a flavoring extract of celery.

In preparing this health-food fresh animal-spleens are hardened and sterilized by subjecting them to heat, preferably to steam heat, at a temperature of approximately 212° Fahrenheit. The spleens must be procured fresh from the slaughter-house on account of their proneness to speedy decomposition. The object in steaming them is a double one—first, to increase their consistency, which is naturally semiliquid, so as to render them capable of being chopped up; secondly, to destroy the germs of putrefaction naturally present either in or upon them. After being steamed a suitable length of time—for example, from twenty to thirty minutes—they are to be minced or comminuted by the use of a sterilized machine, as a meat-chopper or otherwise, the spleen thus comminuted being collected in a sterilized vessel. The marrow is obtained from fresh animal-bones. It should be distinctly understood that there are two kinds of bone-marrow—the red and the white. The red marrow, which is to be used, is obtained from the short or spongy bones, like the vertebrae, the ribs, the breast-bone, and the knuckle ends of the long bones. The red marrow is selected for the reason that it possesses the property of making the blood-cells, of which, in fact, it is chiefly composed. The white marrow contains no such cells and has no blood-making properties whatever. The bones containing the red marrow are preferably to be broken into small pieces by any suitable means or in any suitable manner. Then the pieces are boiled for the proper period of time—for example, from two to three hours—in a vessel with the addition of a small quantity of water and pure gelatin, the proportion being about ninety per cent. of water and ten per cent. of gelatin. It is desirable to make a thick soup of the ingredients, and if it becomes too thick a small quantity of water may be added. This decoction when taken from the fire should be strained through a sterilized sieve. The comminuted spleen and the decoction are then thoroughly mixed at a temperature of about 100° Fahrenheit by constant stirring or in any other suitable way or manner. After becoming thoroughly mixed the composition is cooled down to about 60° Fahrenheit, a temperature at which the gelatin sets or solidifies, thus forming a mixture consisting of a solid though soft mass. Then the composition thus formed is by the use of sterilized utensils packed in sterilized vessels, such as cans or jars. Finally, the vessels containing the mixture are subjected to heat, either dry heat, as in oven, or steam-heat, until steam rises from the mass, when the vessels are hermetically sealed, as by soldering on the covers when cans are used or applying stoppers or the like when the composition is to be inclosed in jars.

In preparing the composition it may be desirable under certain circumstances to flavor the composition, and this may be accomplished by boiling with the bone-marrow, water, and gelatin the leaves and stalks of celery, which are subsequently removed in the process of straining. A little salt may also be added.

The product produced by the herein-described procedure is a perfectly sterilized and very palatable food.

While I have set forth a specific method of preparing the food, it is obvious that modifications may be introduced which will not constitute substantial departures.

What I claim as new, and desire to secure by Letters Patent, is—

1. An article of food consisting of animal-spleen, red bone-marrow, and gelatin; substantially as set forth.

2. An article of food consisting of animal-spleen, red bone-marrow, and gelatin; and the said composition flavored with celery.

3. The method of manufacturing an article of food, consisting in subjecting the spleens of animals to heat of sufficiently high temperature to coagulate the albumen and destroy the germs of putrefaction, comminuting the spleen, and mixing the comminuted spleen with a decoction of sterilized red bone-marrow and gelatin.

4. The method of manufacturing an article of food, consisting in subjecting the spleens of animals to heat of sufficiently high temperature to coagulate the albumen and destroy the germs of putrefaction, comminuting the spleen and mixing the same with a sterilized decoction of red bone-marrow, gelatin, and celery.

In testimony whereof I affix my signature in presence of two witnesses.

EDWARD T. WILLIAMS.

Witnesses:
E. L. STOCKEMER,
FRANK E. CRUFF.